United States Patent [19]
Davis

[11] Patent Number: 5,149,015
[45] Date of Patent: Sep. 22, 1992

[54] RADIO CONTROLLED HOT AIR BALLOON

[76] Inventor: R. Scott Davis, 305 Meridian Dr., Cocoa Beach, Fla. 32931

[21] Appl. No.: 747,000

[22] Filed: Aug. 19, 1991

[51] Int. Cl.⁵ .................................................. B64B 1/40
[52] U.S. Cl. ....................................... 244/31; 244/190; 244/96; 446/225
[58] Field of Search ..................... 244/190, 31, 24, 33, 244/96, 51, 30; 446/225, 220, 68

[56] References Cited

U.S. PATENT DOCUMENTS

| | | | |
|---|---|---|---|
| 3,107,884 | 10/1963 | Simko | 244/31 |
| 3,119,579 | 1/1964 | Borgeson et al. | 244/31 |
| 4,084,771 | 4/1978 | Creuzet | 244/33 |
| 4,361,297 | 11/1982 | Pommereau et al. | 244/97 |
| 4,931,028 | 6/1990 | Jaeger et al. | 446/225 |
| 4,932,606 | 6/1990 | Conn | 244/33 |

Primary Examiner—Joseph F. Peters, Jr.
Assistant Examiner—Christopher P. Ellis
Attorney, Agent, or Firm—Leon Gilden

[57] ABSTRACT

A radio controlled hot air balloon, particularly suitable for use by hobbyists, includes a balloon envelope, a burner assembly and a radio control system. The altitude of the balloon is remotely controlled by adjusting the amount of hot air produced by the burner assembly.

1 Claim, 8 Drawing Sheets

FIG. 9

RADIO CONTROLLED HOT AIR BALLOON

BACKGROUND OF THE INVENTION

1. Field of the Invention

The present invention relates to hot air balloons and more particularly pertains to a hot air balloon which may be operated by radio control.

2. Description of the Prior Art

The use of hot air balloons is known in the prior art. More specifically, hot air balloons heretofore devised and utilized for the purpose of recreation are known to consist basically of familiar, expected obvious constructural configurations, not withstanding the myriad of designs encompassed by the crowded prior art which has been developed for the fulfillment of countless objectives and requirements.

With respect to prior art balloon constructions, U.S. Pat. No. 3,273,066, which issued to L. H. Ruhnke on Sep. 13, 1966, discloses a balloon apparatus for detecting changes with the atmospheric electric field. U.S. Pat. No. 4,042,882, which issued to Gustavo G. Camacho and Edward J. Schackleford on Aug. 16, 1977, discloses an inflatable balloon for locating people in distress. U.S. Pat. No. 3,676,779, which issued to Merle E. Faulring and John A. Faulring on Jul. 11, 1972, discloses a balloon package which carries a radio transmitter for locating downed aircraft. U.S. Pat. No. 4,048,565, which issued to Loyal E. Rice, Sr. on Sep. 13, 1977, discloses a balloon equipped location indicating device.

While the above mentioned devices are suitable for their intended usage, none of these devices disclose a hot air balloon that can be remotely controlled. In this respect, the remotely controlled hot air balloon according to the present invention substantially departs from the conventional concepts and designs of the prior art, and in so doing provides an apparatus primarily developed for the purpose of providing recreation to hobbyists.

Therefore, it can be appreciated that there exists a continuing need for new and improved hot air balloons which can be used for recreation. In this regard, the present invention substantially fulfills this need.

SUMMARY OF THE INVENTION

In view of the foregoing disadvantages inherent in the known types of hot air balloons now present in the prior art, the present invention provides an improved hot air balloon construction wherein the same can be utilized for recreational purposes. As such, the general purpose of the present invention, which will be described subsequently in greater detail, is to provide a radio controlled hot air balloon which has all the advantages of the prior art hot air balloons and none of the disadvantages.

To attain this, the present invention comprises a remotely controllable hot air balloon particularly suitable for use by hobbyists, which includes a balloon envelope, a burner assembly and a radio control system. The altitude of the balloon is remotely controlled by adjusting the amount of hot air produced by the burner assembly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a radio controlled hot air balloon which has all the advantages of the prior art hot air balloons and none of the disadvantages.

It is another object of the present invention to provide a radio controlled hot air balloon which may be easily and efficiently manufactured and marketed.

It is a further object of the present invention to provide a radio controlled hot air balloon which is of a durable and reliable construction.

An even further object of the present invention is to provide a radio controlled hot air balloon which is susceptible of a low cost of manufacture with regard to both materials and labor, and which accordingly is then susceptible of low prices of sale to the consuming public, thereby making such radio controlled hot air balloons economically available to the buying public.

Still another object of the present invention is to provide a radio controlled hot air balloon which will be well suited for use by hobbyists.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
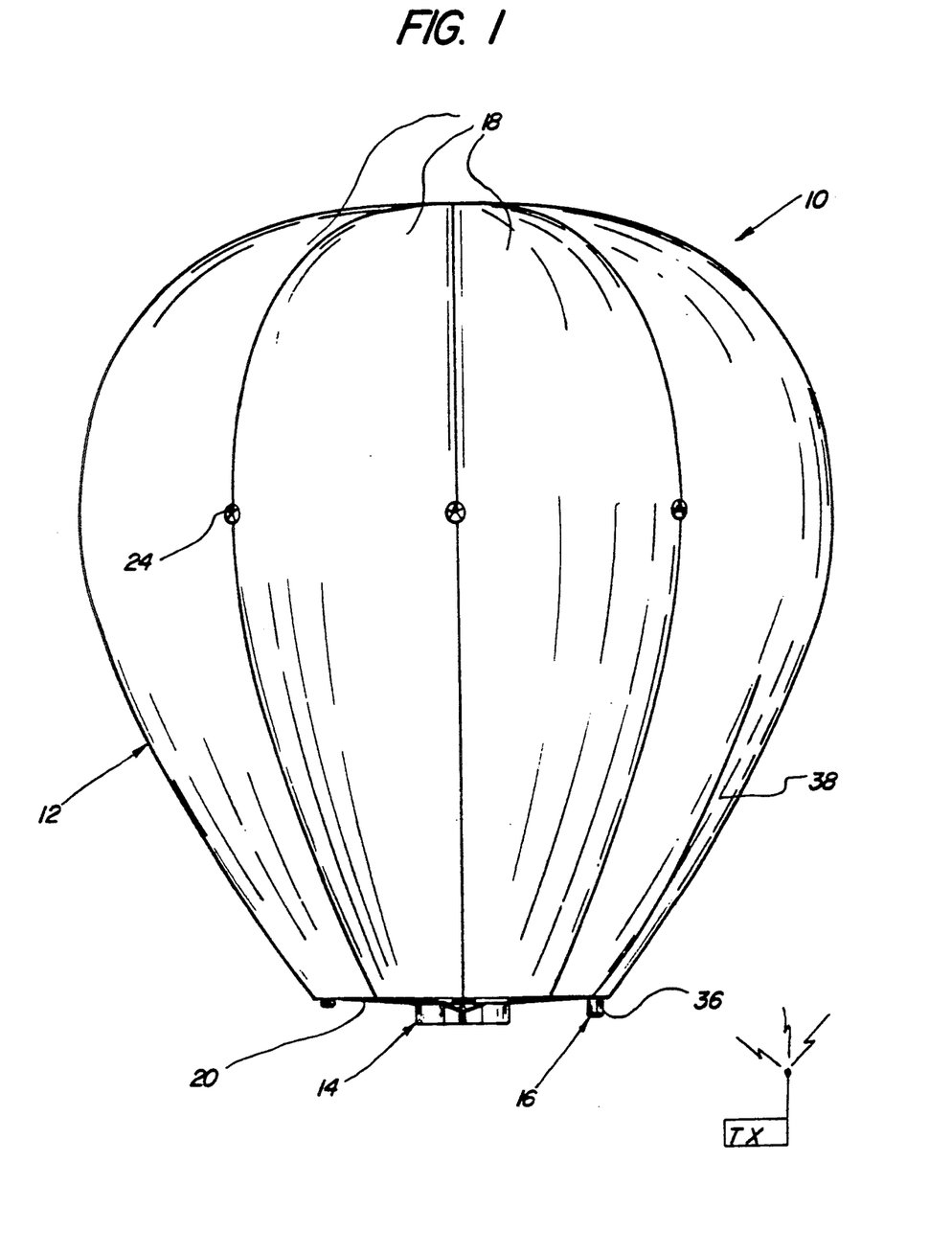
FIG. 1 is a front elevation view of the radio controlled hot air balloon comprising the present invention.

With reference now to the drawings, and in particular to FIG. 1 thereof, a first embodiment of a radio controlled hot air balloon embodying the principles and concepts of the present invention and generally designated by the reference numeral 10 will be described.

More specifically, it will be noted that balloon assembly 10 essentially comprises a balloon envelope 12, a burner assembly 14 and a radio control system 16. As shown, the balloon envelope 12 includes a variety of panels, each of which is generally designated by the reference numeral 18 and a base structure 20. The panels 18, and the base 20 are joined by any conventional means to form a teardrop shape when fully inflated to an opened position.

Figures 2, 3:
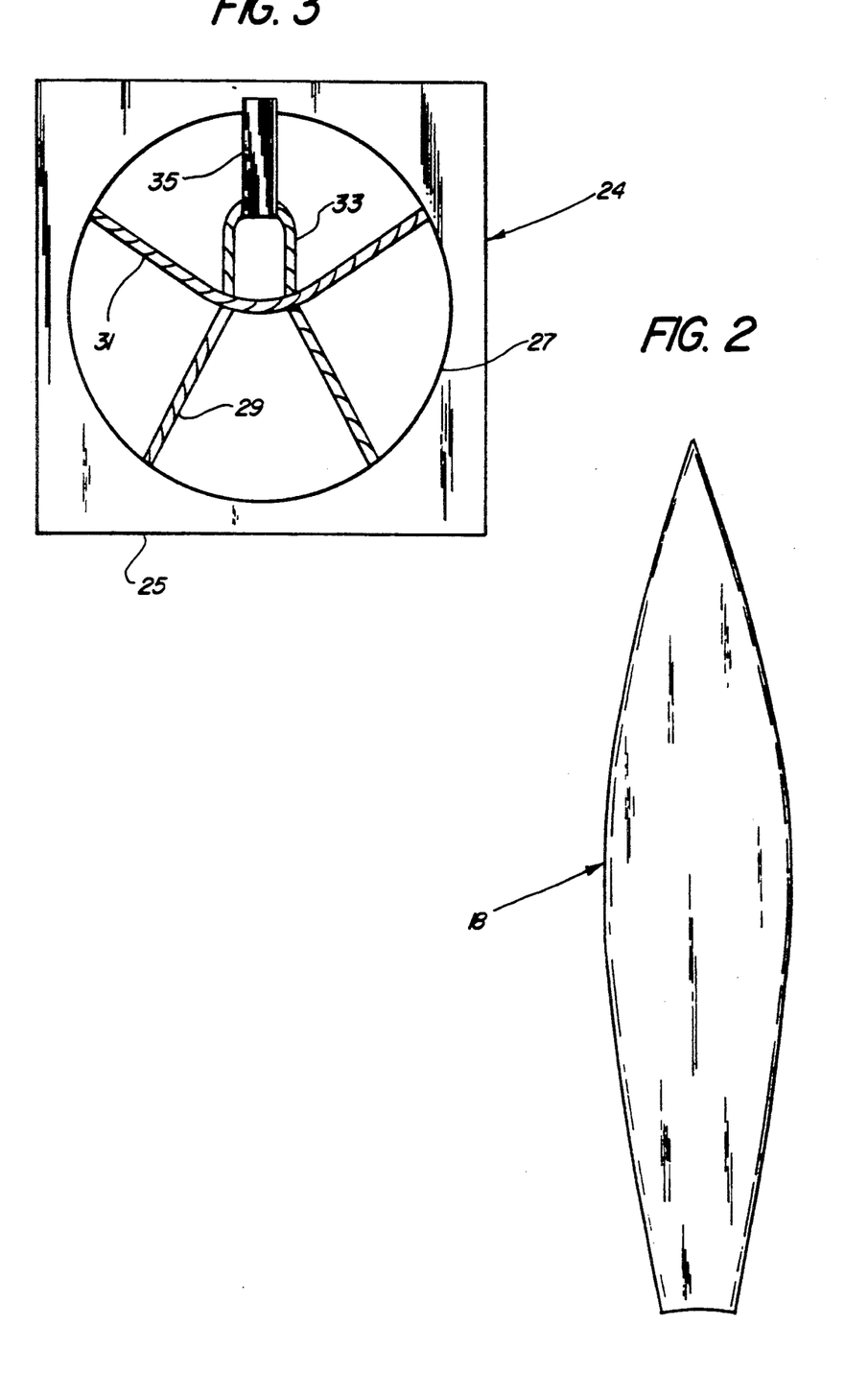
FIG. 2 is a front elevation view of the balloon panels used in the present invention.
FIG. 3 is a front elevation view of a launching lug used with the present invention.

As best illustrated in FIG. 2 panel 18 would preferably be constructed of conventional tissue paper utilized by model aircraft hobbyists. The panels 18 are bonded together along each seam and to base 20 by ordinary adhesive.

Referring now to FIG. 3, which may be considered along with FIG. 1, a plurality of launching lugs 24 are attached at each vertical seam along a peripheral portion of envelope 12. Each launching lug 24 is comprised of a round label 27 having a peel-off backing 25, such as waxed paper or the like. A first section of string 29 is glued along portions thereof to the label 27. A second string member 31 is similarly glued along portions thereof to the label 27 and in a manner whereby it crosses over the first string member 29 as best illustrated in FIG. 3. A looped portion 33 of the first string member 29 remains unglued and fits over a pin formed in a launch stand. A grab tab 35 constructed from a piece of masking tape facilitates the capturing of the loop 33 by an individual when it is desired to attach the balloon envelope 12 to a launch stand.

Figure 4:
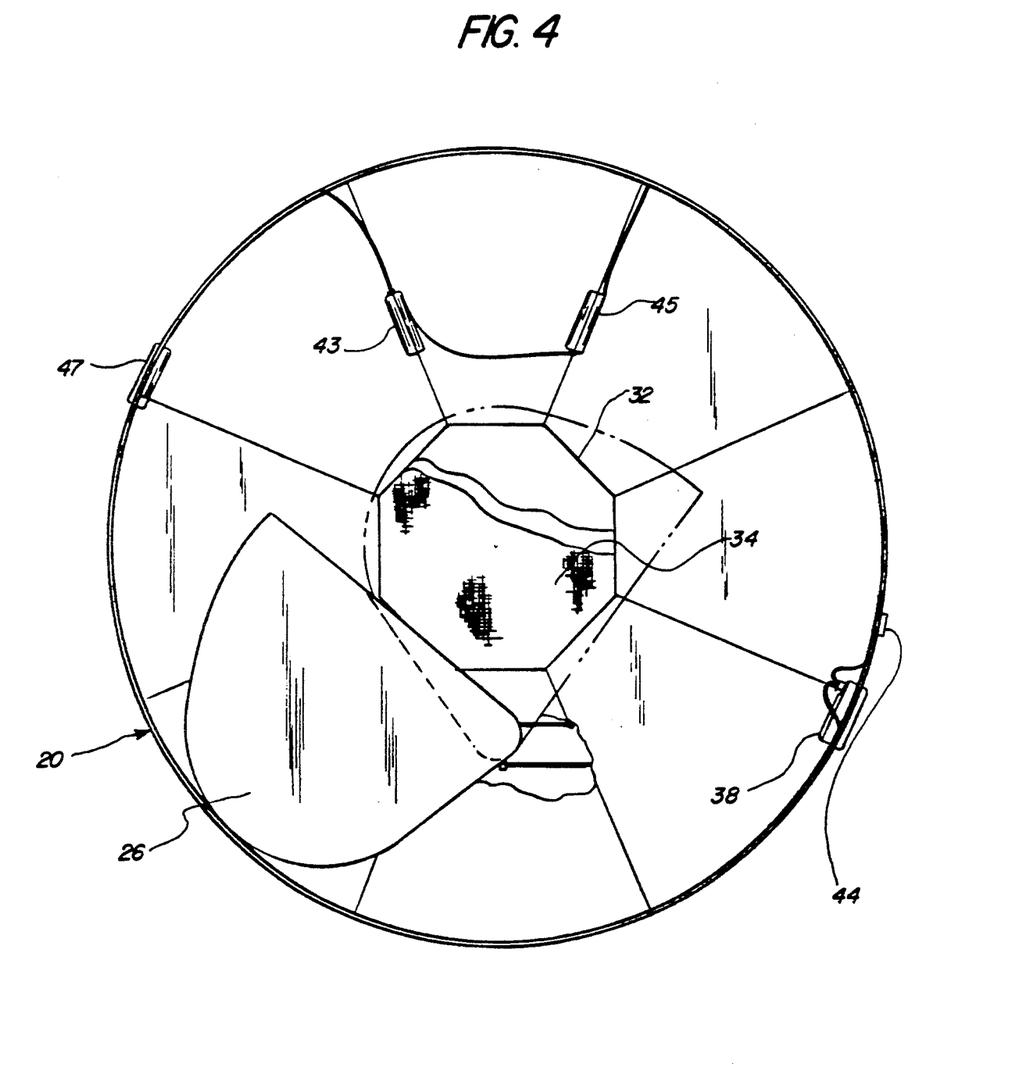
FIG. 4 is a top plan view of the burner assembly associated with the present invention.
Figure 5:
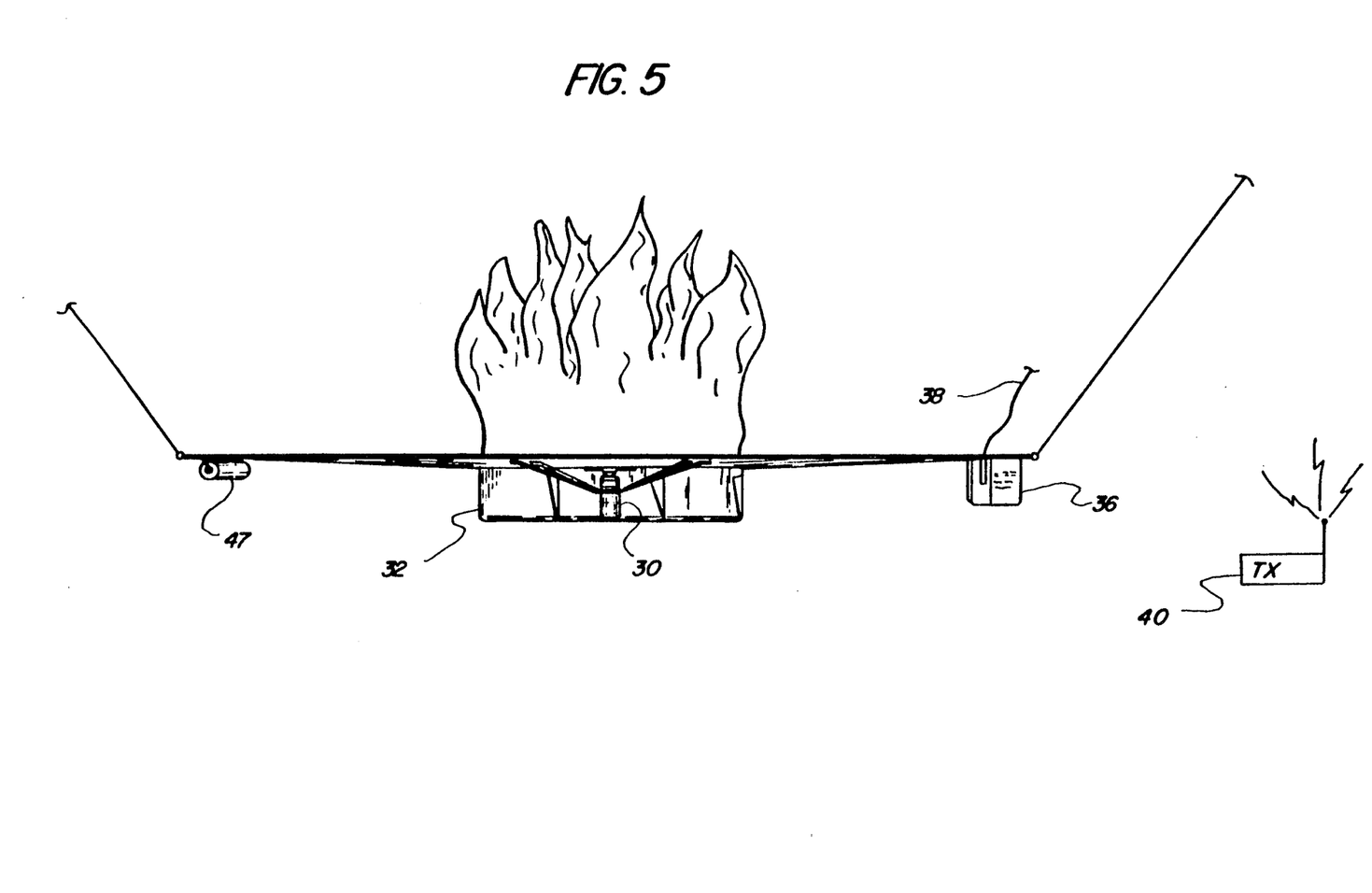
FIG. 5 is a side elevation view of the burner assembly.

Referencing FIGS. 4 and 5 in conjunction with FIG. 1, it will be noted that one of the unique and inventive features of the present invention 10 is the ability to remotely adjust the flame, and therefore the amount of available hot air generated by the burner assembly 14. More particularly, the burner assembly 14 is attached to base 20 by any conventional means and it includes a flame shield 26, a microservo 30, a fuel tray 32, a supply of fuel 34 and a wick 36. Flame shield 26 is constructed of any lightweight, heat resistant material, such as carbon fiber cloth impregnated with high temperature Devcon to make it stiff, is pivotedly attached to base 20 to allow horizontal movement across the face of fuel tray 32. Microservo 30 controls the movement of flame shield 26, thereby controlling the amount of air to support combustion of fuel 34. FIG. 4 shows flame shield 26 in a full open position, while a full closed position will put out the flame. Fuel 32 is typically denatured alcohol which has the property of burning clean, is readily available, is inexpensive and is thus, well suited for the hobbyist. Fiberglass wick 34 is positioned in the bottom of fuel tray 30 to keep the entire surface of the tray wet and thereby enable full heat when fuel 32 is at a low level.

With continuing reference to FIGS. 1, 4 and 5, radio control system 16 includes receivers 36, antenna 38, transmitter 40, batteries 43, 45, 47 and switch 44. Receiver 36 is a conventional two channel design and is positioned on base 20 for best balance. Referring specifically to FIG. 1, antenna 38 is attached to receiver 36 and panel 18 by any conventional means. Transmitter 40 provides remote radio signals to receiver 36 which in turn sends an electric signal to microservo 30 to control the position of flame shield 26, thereby regulating the amount of hot air available for controlling the altitude of balloon assembly 10.

The three carbon batteries 43, 45 and 47 provide electrical energy to switch 44 to operate flame shield 26. Two of the carbon batteries 43, 45 are positioned opposite the servo 30 to make tray sag even, and the third one 47 is positioned opposite the receiver 36 for best overall balance. All control wires are soldered directly to the batteries 43, 45, 47.

As to the manner of usage and operation of the present invention, the same should be apparent from the above description. However, a brief summary thereof will be provided. More specifically, it can be seen that balloon assembly 10 can be used in the remote mode. In this respect, flame shield 26 is set by radio control 16 at full open and fuel tray 32 is loaded with fuel (approximately two and a half ounces). Flame shield 26 is then set to one quarter open and while the balloon envelope 12 is held open, fuel is manually ignited, then flame shield 26 is set to full open and the balloon 12 rapidly inflates with hot air and lifts off the ground. The position of flame shield 26 over the face of fuel tray 32 controls the amount of hot air and thereby the altitude of the balloon envelope 12. Altitude can be controlled to within a few inches and the flight can be terminated at anytime by simply setting flame shield 26 to full closed by use of trim control on the transmitter 40.

Figure 6:
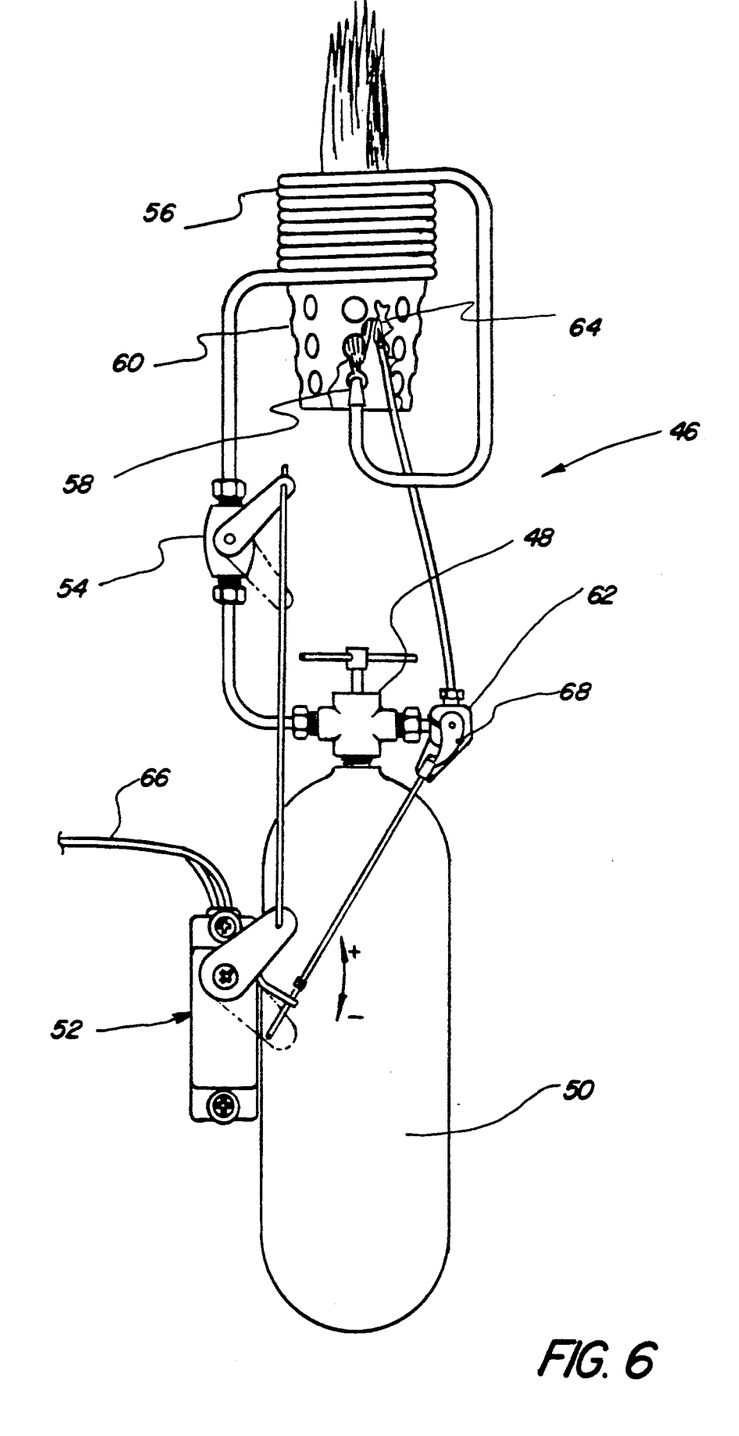
FIG. 6 is a front elevation view of a second embodiment of the burner assembly used with the present invention.

FIG. 6 of the drawings illustrates a modified embodiment of the burner assembly wherein such modified embodiment is identified by reference numeral 46. In this modified version of burner assembly 46, liquid fuel (denatured alcohol) is replaced by a self contained gas system for a more practical method of operation.

As to both the construction and manner of operation of this modified embodiment 46, a main valve 48 is opened to allow gas to flow freely from a tank 50. Servo 52, controlled by radio control system 16, adjusts a blast valve 54 to control the amount of gas to a vaporizing coil 56 around nozzle 58. Heat shield 60 protects the balloon envelope 12 from the flame and concentrates the hot air towards the center of the envelope. Pilot valve 62 provides control of gas flow from tank 50 to ignite pilot light 64. Pilot light 64 provides assurance of a continuous flame when blast vale 54 is throttled back to a smaller flame. Control wires 66 are attached to the servo 52 and connect the servo to the receiver 36 and batteries 43, 45, 47. A torsion spring 68 applies a clockwise force to the pilot light valve shaft so that the valve closes when the trip rod is hit by the servo arm in its most minus extreme. A gas tank 50 in its preferred embodiment is a propane tank, although it is to be understood that butane could also be used. Attachment bracketry with this modified embodiment 46 of the invention is not shown since numerous variations are possible. The amount of hot air, and therefore, the altitude of balloon assembly 10, is controlled in the same manner as in the preferred embodiment.

Figure 7:
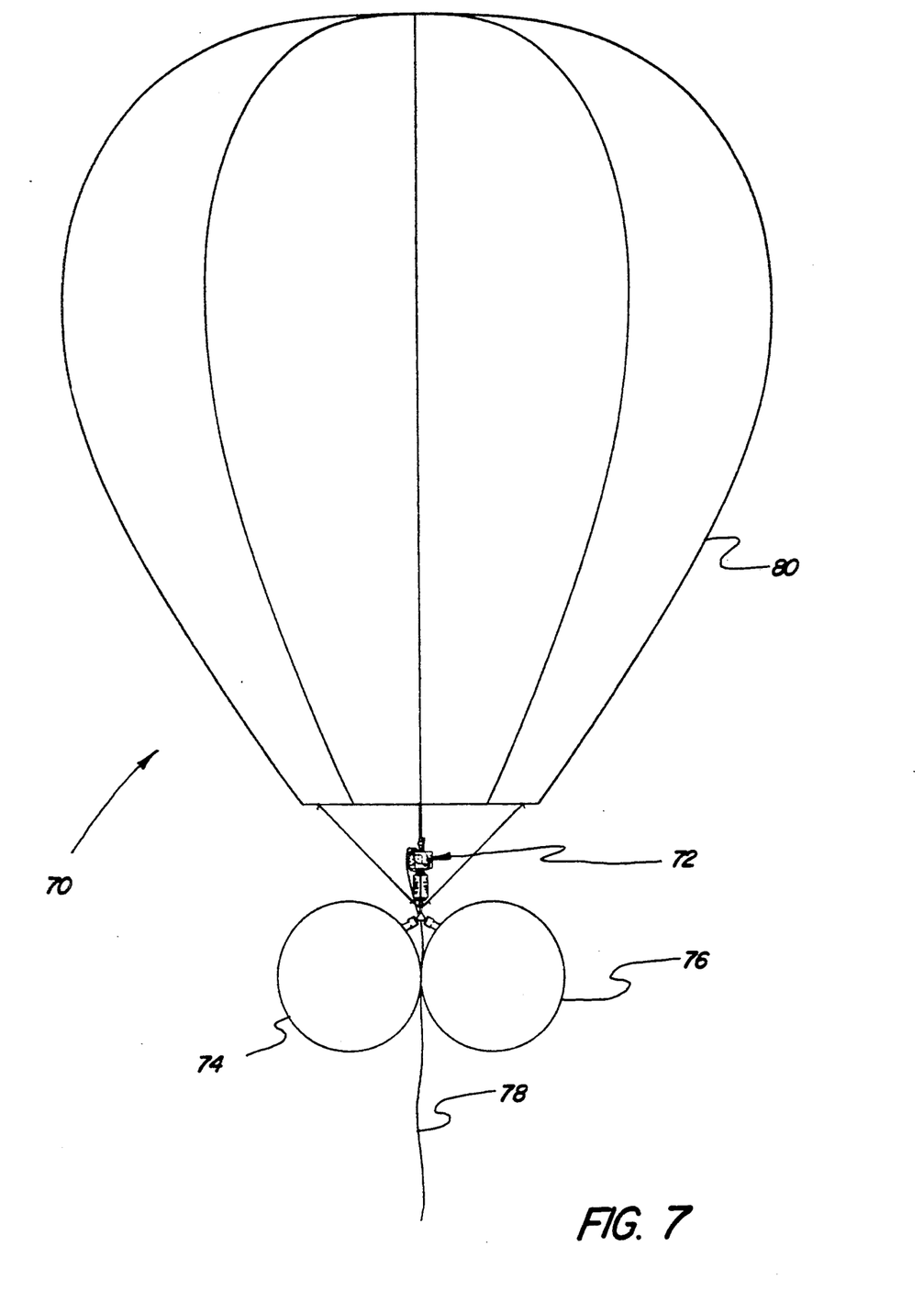
FIG. 7 is a front elevation view of a second embodiment of the radio controlled hot air balloon comprising the present invention.

FIG. 7 illustrates a further modified embodiment of the invention which is of a more recent design and which effectively constitutes the preferred embodiment thereof. This modified embodiment is generally designated by the reference numeral 70. As can be seen, the embodiment 70 utilizes a modified burner construction 72 which will be described subsequently in greater detail and which utilizes a pair of balloons 74, 76 to store a gaseous supply of propane fuel. The burner 72 is also radio controlled and utilizes an antenna wire 78 which is suspended therefrom. The burner assembly 72 is suspended from a balloon envelope 80 which requires no launching lugs 24 due to a different launching method.

Figure 8:
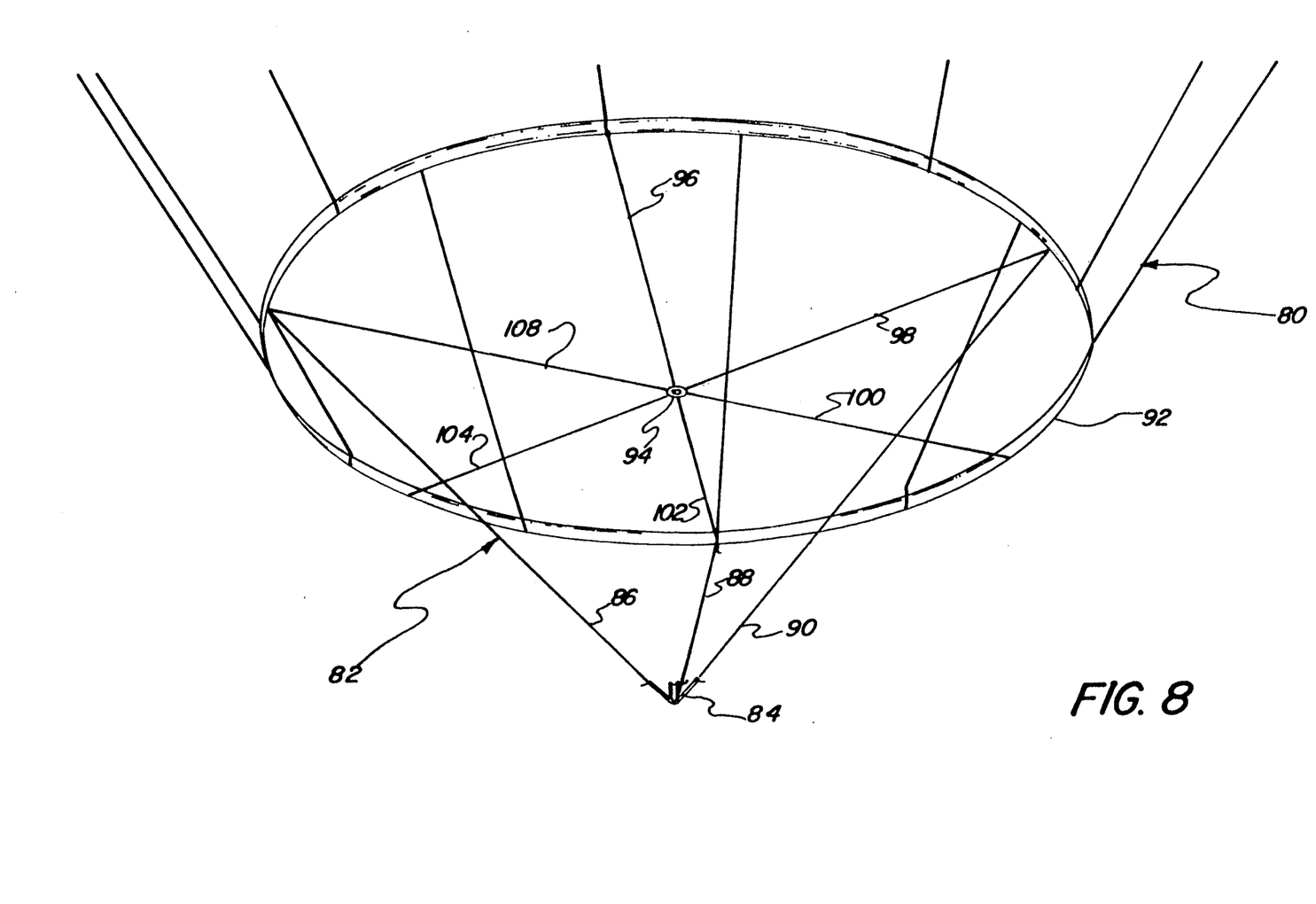
FIG. 8 is a perspective view of the burner support structure associated with the second embodiment of the invention.

FIG. 8 of the drawings illustrates the burner support structure 82 which is fixedly secured to the bottom open end of the balloon envelope 80. The burner support structure 82 includes a lower burner support 84 which is suspended from the envelope 80 by three cords 86, 88, 90. The cords 86, 88, 90 are attached at equidistant points around the peripheral edge of the opening 92 formed in the bottom of the balloon envelope 80.

The burner support structure 82 further includes an upper burner support 94 which is effectively a ring which receives the brass tube burner as will be discussed with relation to FIG. 9 of the drawings. The upper burner support 94 is attached to the peripheral edge of the opening 92 by six equidistantly-spaced cords 96, 98, 100, 102, 104, 106.

Figure 9:
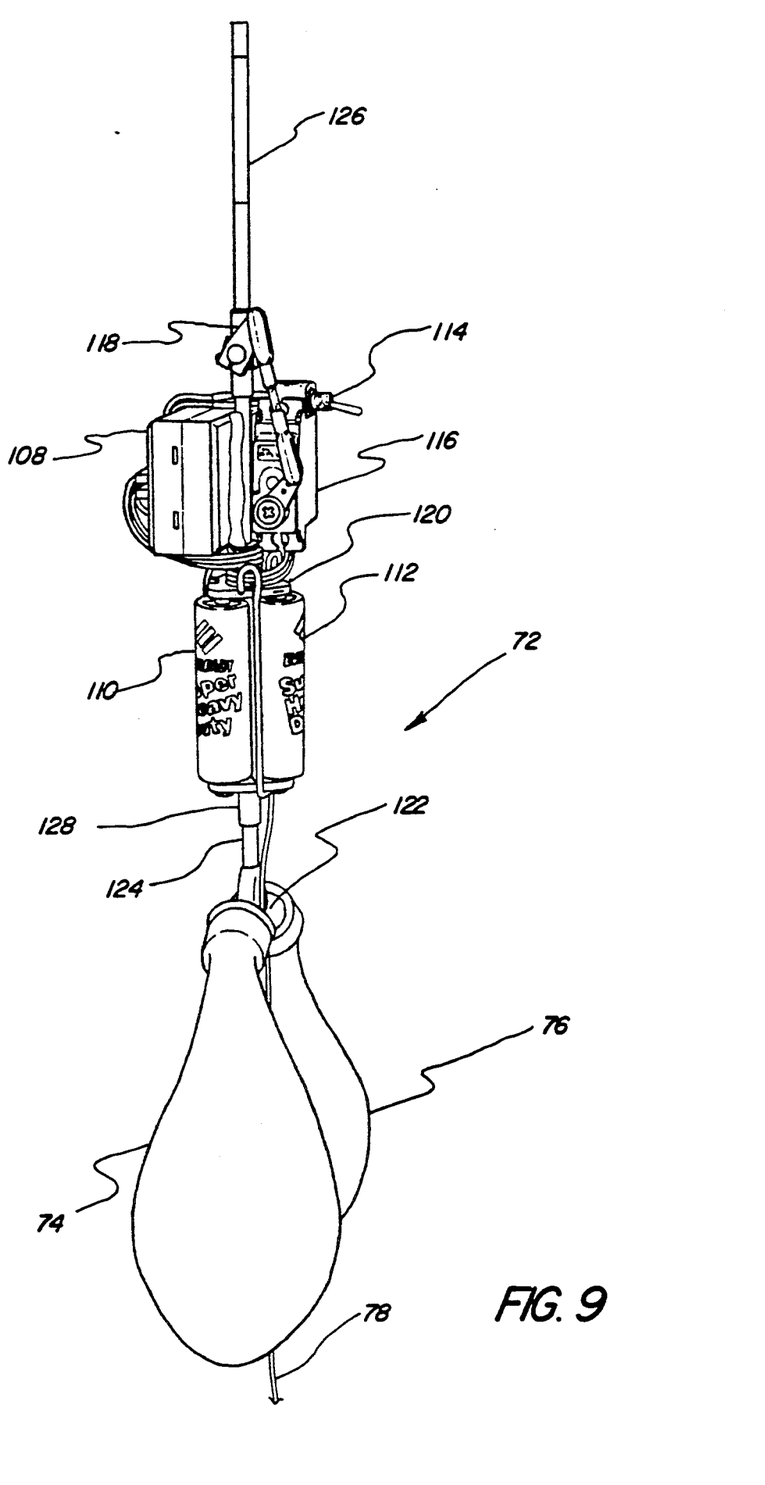
FIG. 9 is a perspective view of the burner assembly utilizable with the second embodiment of the invention.

FIG. 9 of the drawings illustrates the modified burner 72 which utilizes the aforementioned fuel supply balloons 74, 76. The burner assembly 72 includes a receiver 108 operably powered by a pair of batteries 110, 112 (with a third battery being unillustrated) with power delivery to the receiver being controlled by an on/off switch 114. A microservo 116 operates a valve 1118 in response to a received signal from the receiver 108, while the batteries 110, 112 are retained in a juxtaposed position beneath the receiver 108 and microservo 116 by a spring loaded top plate 120 that also facilitates a quick replacement of the three AA-sized batteries.

A balsa wood adapter 122 (covered with monokote) allows for quick replacement of the fuel balloons 74, 76 and serves as a conduit for directing propane gas upwardly through a supply conduit 124 to a brass tube 126 which serves as the burner. The conduit 124 is provided with a plastic sleeve 128 which fits into the aforediscussed lower burner support 84, and the brass tube 126 is positionable through the aforementioned upper burner support 94.

As can be appreciated, the propane burner 72 has many advantages over an alcohol burner. In effect, the burner assembly 72 is formed as a single package which includes the receiver 108, the servo 116, the batteries, the burner tube 126, the valve 118, and the fuel supply 74, 76 which can be connected or disconnected quickly from the balloon envelope 80. Propane can produce 20,000 BTU's of heat per pound whereas alcohol can only produce 12,000 BTU's of heat per pound. This means that one and one half ounces of propane can do what two and one half ounces of alcohol can do. Further, by the use of propane gas, there is no liquid fuel to spill which results in a much safer operation due to the fact that the balloon 80 can now bump into objects without worrying about spilled fuel. Further, the heat producing flame can instantly be reduced to the size of a cigarette lighter (set on low volume) and can be independently shut off at any time.

Other advantages include the fact that no launch stand is needed and since the flame is much narrower and no big flame shield is needed, the size of the hoop 92 at the base of the balloon 80 has been reduced in size to provide a more to scale look at the bottom of the envelope. The use of propane gas also reduces the amount of work necessary by the servo 116, and the flame looks more realistic while the burner actually makes a realistic hissing sound. If desired, the flame can be blasted at a slant which is useful when the balloon is being moved back to its starting point into a light wind. By the use of propane, it has been found that the balloon envelope 80 can lift more weight and could potentially carry an hour's worth of fuel. Additionally, propane is substantially cheaper to utilize and a user can always tell how much fuel is left just by viewing the size of the propane filled balloons 74, 76. As a final safety consideration, in the event that balloons rupture while the flame is operating, no ignition will occur due to the instant thinning of the gas in the air and by the fact that propane is heavier than air and tends to drop below the flame.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hot air balloon assembly comprising:
    balloon means;
    hot air generating means for providing a supply of hot air to said balloon means, thereby to effect a desired floatation of said balloon means above a ground surface, said hot air generating means including a burner and a fuel supply associated with said burner, said fuel supply comprising a combustible gas retained within at least one expandable balloon, said balloon means serving to pressurize said gas and to effect a displacement thereof from said balloon means to said burner;

remote control means for controlling said hot air generating means, said remote control means including a radio control system, said radio control system including a receiver attached to said hot air generating means and a remotely positionable transmitter for sending operating signals to said receiver;

a flame shield movably positionable relative to a fuel tray associated with said burner, said receiver operating to move said flame shield over said fuel tray to effect an extinguishment of a flame associated with said burner, and further operating to move said flame shield away from said fuel tray to increase a burning capacity of said fuel tray to thereby increase a supply of said hot air to said balloon means, said burner further including a fuel supply line whereby said combustible gas may be supplied to said burner for effecting a generation of said hot air, said fuel supply line further including a vaporizing coil positionable around a heat shield associated with said burner, said heat shield shielding said balloon means from said flames;

and at least one launching lug attached to a peripheral portion of said balloon means, said at least one launching lug including a round label having a peel-off backing adhesive for attaching said label to said balloon means, and further including a first section of string glued along said label and a second section of string similarly glued along said label and overlying said first section of string, thereby to provide an attachment loop, and further including a grab tab attached to said loop and facilitating a capturing of said loop by an individual when it is desired to attach said balloon means to a launch stand.

* * * * *